United States Patent [19]

Eschwey et al.

[11] 4,343,728

[45] Aug. 10, 1982

[54] PROCESS FOR PREPARING SOLUTION POLYMERIZATES OF ACRYLIC AND METHACRYLIC ESTERS AND THEIR USE AS FLOW-PROMOTING AGENTS IN LACQUERS

[75] Inventors: Helmut Eschwey, Michelstadt-Odenwald; Bernd Wegemund, Haan; Wolfgang Gress, Wuppertal-Elberfeld, all of Fed. Rep. of Germany

[73] Assignee: Henkel Kommanditgesellschaft auf Aktien, Düsseldorf-Holthausen, Fed. Rep. of Germany

[21] Appl. No.: 192,555

[22] Filed: Sep. 30, 1980

[30] Foreign Application Priority Data

Oct. 3, 1979 [DE] Fed. Rep. of Germany ....... 2940042

[51] Int. Cl.³ .......................... C08K 5/05; C08K 5/10
[52] U.S. Cl. .................... 523/456; 526/212; 526/329.7; 524/385; 524/386; 524/387; 524/388
[58] Field of Search ............................ 526/212, 329.7; 260/22 CB, 31.2 R, 31.2 N, 33.4 R, 33.4 EP, 33.4 UR

[56] References Cited

U.S. PATENT DOCUMENTS

| | | | |
|---|---|---|---|
| 3,228,922 | 1/1966 | Prapas | 526/212 |
| 3,928,266 | 12/1975 | Scohy et al. | 260/22 CB |
| 3,940,353 | 2/1976 | Martorano | 260/22 CB |
| 4,075,242 | 2/1978 | Rhum et al. | 526/329.7 |

*Primary Examiner*—Harry Wong, Jr.
*Attorney, Agent, or Firm*—Hammond & Littell, Weissenberger and Muserlian

[57] ABSTRACT

The invention herein relates to the preparation of solution polymerizates of acrylic and methacrylic esters. More particularly, this invention relates to a process for the preparation of solution polymerizates of acrylic or methacrylic acid esters of alcohols wherein acrylic or methacrylic monomers are polymerized in a solvent of high-boiling alcohols of from 8 to 40 carbon atoms and 1 to 6 hydroxyl groups, the total batch to be polymerized containing from about 15 to 85 percent by weight of polymerizable substance, based on the weight of the total batch. This invention also relates to a method of using said solution polymerizates to improve the flow properties of lacquers.

12 Claims, No Drawings

PROCESS FOR PREPARING SOLUTION POLYMERIZATES OF ACRYLIC AND METHACRYLIC ESTERS AND THEIR USE AS FLOW-PROMOTING AGENTS IN LACQUERS

FIELD OF THE INVENTION

The invention herein relates to the preparation of solution polymerizates of acrylic and methacrylic esters. More particularly, the invention relates to the preparation of solution polymerizates of acrylic or methacrylic esters wherein the acrylic or methacrylic ester acid monomers are polymerized in high boiling solvents.

BACKGROUND OF THE INVENTION

The preparation of polymerizates from acrylic or methacrylic acid esters of various alcohols, in bulk as well as in solvent, has been known for a long time. For the latter method, hydrocarbons such as xylene or mineral oils, as well as solvents with functional groups, such as butanol, cyclohexanone, nitrobutane, acetic acid, and solvents having similar groups, can be used, for example. The polymers can then either be isolated directly from the solvents or be used in the form of the solution, as an aid in the preparation of lacquers based on epoxy resins, polyurethanes, chlorinated rubbers, polyvinyl chlorides, or nitrocellulose. Use of such polymer solutions in the lacquers can reduce frequently encountered disturbances and surfaces irregularities such as unaligned edges, orange-peel or egg-shell effects, or dimpling. The results generally are satisfactory, but the desired effect is not always achieved to an adequate degree, particularly when the polymerization was carried out in mineral oils or esters and the polymers are used without intermediate isolation. In addition, mineral oils and esters of fatty acids are basically undesirable as additives in lacquer components since they remain in the film after the drying of the lacquers and frequently are incompatible. These solvents can cause flow disturbances by floating to the surface, thereby forming fish eyes, and the like. When the acrylates are prepared in mineral oils, frequently products are obtained which are highly viscous, which may contain gel particles, which are difficult to handle, and which have an undesirably broad, undefined molecular weight distribution.

Thus, there has been a need for flow-promoting or leveling agents based on polyacrylates or polymethacrylates which do not have any negative influence on the finished coating due to the solvent. There has also been a need to find solvents in which the polymerizable acrylates or methacrylates remain easy to handle even at a concentration above 30%, especially 40%, and can be polymerized reproducibly on a technical scale under conditions of uniform temperature. Advantageously, the desired solvents act as reactive thinners that would be incorporated into a lacquer film itself in the manner that epoxy compounds, for example, can act as reactive thinners in epoxy lacquers.

OBJECTS OF THE INVENTION

It is an object of the invention to provide a novel procedure for preparing solution polymerizates of acrylic or methacrylic esters.

It is also an object of the invention to provide a procedure for preparing solution polymerizates of acrylic or methacrylic esters whereby the acrylic or methacrylic ester monomers are polymerized in high boiling alcohols with from 8 to 40 carbon atoms.

It is a further object of the invention to provide a procedure for employing solutions of polymers of acrylic or methacrylic esters prepared in situ as flow-promoting agents for lacquers.

These and other objects of the invention will become more apparent in the discussion below.

DETAILED DESCRIPTION OF THE INVENTION

Applicants have surprisingly found a procedure for preparing solution polymerizates of acrylic and methacrylic esters which are particularly suitable for use in lacquers. According to Applicants' invention, solution polymerizates based upon acrylic or methacrylic esters are prepared by use of a procedure where high-boiling alcohols with from about 8 to 40, preferably from about 10 to 36, carbon atoms and from about 1 to 6, preferably from about 1 to 4, hydroxyl groups are used as solvent for the polymerization. The total batch for polymerization contains from about 15 to 85 percent by weight, preferably from about 30 to 75 percent by weight, of polymerizable substance, based on the weight of the total batch, in addition to the solvents containing hydroxyl groups.

Thus, alcohols such as, for example, n-octanol or the other isomeric octanols, are suitable as solvents for the polymerization. similarly, ethylhexanol and the isomeric dimethyloctanols are also suitable solvents. All suitable alcohols must have a boiling point above 160° C., preferably above 200° C. A group of alcohols that can advantageously be used comprises the so-called fatty alcohols with from approximately 12 to 18 carbon atoms. Also suitable are saturated, mono-alcohols with from 12 to 36 carbon atoms and known as Guebert alcohols. The Guebert alcohols are prepared by Guebert condensation of alcohols having one-half of the final chain length, that is, alcohols having from 6 to 18 carbon atoms.

Suitable diols are obtainable by hydrolysis from aliphatic epoxy compounds, for example. The epoxy groups may be internal as well as terminal in these cases. Useful diols include, for example, dodecyldecane diol or octadecyldecane diol. With the proper length of the carbon chain, more than from 1 to 6 OH-groups per molecule may also be suitable. Such substances that contain more than 2 hydroxyl groups can be obtained by hydrolysis from aliphatic epoxides, starting with from 2 to 3 epoxy groups in the molecule.

Furthermore, there is another group of suitable aliphatic hydroxyl compounds that are obtained by the addition of carbon monoxide and subsequent hydrogenation from unsaturated and possibly polyunsaturated fatty alcohols. There are primary alkanols such as bis-(hydroxymethyl)-octadecanol or hydroxymethyloctadecanol. Also suitable are the synthetic alcohols that can be prepared by hydrogenation from branched fatty acids with from approximately 9 to 18 carbon atoms or their esters. An especially advantageous specific poymerization may be achieved by the combination of alcohols of the above-mentioned type.

The polymerization is initiated in the known manner by radical formers. Except for when energy-rich radiation is used, compounds that break down into radicals, such as peroxides, hydrogen peroxides, or azo compounds, usually are employed to initiate the reaction. In such cases, benzoyl peroxide, azo-bis-isoacid butyric dinitrile, or a hydrogen peroxide such as cumene hydrogen peroxide or butylhydrogen peroxide, and the like, are suitable. Conventional regulators also may be added to control the reaction.

The customary alcohol components that can be used in the acrylic esters or methacrylic esters are those that are aliphatic or cycloaliphatic and that contain from 1 to 16, especially from 2 to 10, carbon atoms, such as octyl acrylate, dodecyl methacrylate, and similar compounds, aditional co-monomers also may take part in the polymerization in an amount of up to from about 5 to 15%. These co-monomers, which are suitable for modification, generally also are acrylic acid compounds such as, for example, acrylamide or acrylamide substituted at the nitrogen, such as N-methylmethacrylamide or n-butylacrylamide, or also acrylonitrile, vinylidene chloride, styrene, methylstyrene, or butadiene, or methylbutadiene.

Although the polymers themselves can be isolated by precipitation, in conventional manner, it has been found to be advantageous to use the solution polymerizates prepared directly as lacquer additives. They bring about a surprisingly good improvement in the leveling or flow property of the lacquer mixed with it and are suitable in concentrations of from about 0.2 to 5 percent by weight, based on the weight of the total lacquer system. The solution polymerizates may be used, for example, in reactive systems of two components such as polyurethane lacquers or epoxy lacquers. They also show a good effect in air-drying lacquers, for example, those based on alkyd resins, acrylate resins, or polyvinyl chloride.

The following examples are intended to illustrate the invention and are not to be construed as limiting the invention thereto.

EXAMPLES

I. Examples 1 to 8

Preparation of the Co-polymers

Twenty kilograms of solvent are placed into a 100-liter, V4A-steel vessel, the vessel having anchor agitator and external cooling water at 15° C., and are heated under a nitrogen atmosphere to 90° C. Then, a mixture of 55.6 kg of ethylhexyl acrylate, 4.4 kg of ethyl acrylate, 20 kg of solvent, and 0.2 kg benzoylperoxide is added dropwise and with agitation during a period of 2½ hours. Cooling is started when the temperature exceeds 92° C. Depending on the type of solvent, the following may be observed:

(a) a constant temperature of from 80° to 90° C., or
(b) a rise in temperature to from greater than 100° C. to 160° C.

Some partially cross-linked products with undesirably broad molecular weight distribution are the result in situation (b).

The various solvents and the corresponding courses of polymerization are shown in the tables below. Polyacrylate/solvent mixtures according to the invention are set forth in Table I, and comparison runs a, b, and c are shown in Table II.

TABLE I

| Example | Solvent | Temperature Interval |
|---|---|---|
| 1 | Guebert alcohol-$C_{16}$ | 80° to 82° C. |
| 2 | Guebert alcohol-$C_{20}$ | 80° to 85° C. |
| 3 | Guebert alcohol-$C_{16}/C_{12}$ | 80° to 83° C. |
| 4 | Guebert alcohol-$C_{12}$ | 80° to 83° C. |

TABLE I-continued

| Example | Solvent | Temperature Interval |
|---|---|---|
| 5 | Guebert alcohol-$C_8/C_{10}$ | 80° 82° C. |
| 6 | Fatty alcohol-$C_8/C_{10}$ | 80° to 83° C. |
| 7 | Bis-(hydroxymethyl)octadecanol-($C_{20}$) | 80° (constant) |
| 8 | Hydroxymethyloctadecanol ($C_{19}$) | 80° (constant) |

TABLE II

| Comparison Run | Solvent | Temperature Interval |
|---|---|---|
| a | Lacquer benzene 140/200° C. | 80° to 125° C. |
| b | Isoparaffins 200/240° C. | 80° to 120° C. |
| c | Esters of trimethyl propane with fatty acid $C_6$–$C_8$ | 80° to 150° C. |

II. EXAMPLE 9

Preparation of Lacquers

Lacquers having the following compositions were prepared:

| (A) Solvent-free Epoxy Lacquer | |
|---|---|
| Component 1 (milling batch): | |
| Epoxy resin (epoxide value 0.52) | 300.0 gm |
| Hydrogenated castor bean oil | 12.0 gm |
| Barium sulfate | 63.0 gm |
| Titanium dioxide | 40.0 gm |
| Talcum | 75.0 gm |
| Yellow iron oxide | 10.0 gm |
| | 500.0 gm |
| Component 2 (milling batch): | |
| Commercial imidazoline groups containing polyamino amide from dimerized fatty acids and technical grade polyamines (amine number 190) | 300.0 gm |
| Titanium dioxide | 40.0 gm |
| Chrome yellow | 30.0 gm |
| Barium sulfate | 130.0 gm |
| | 500.0 gm |

Each milling bath was ground on a three-roller mill. A polyacrylate/solvent mixture from Examples 1 to 8 or comparison runs a to c was added to Component 1, Components 1 and 2 were combined. (The polyacrylate/solvent mixture could instead be added to the combined milling batches, that is, Components 1 to 2 together).

| (B) Polyurethane Lacquer | |
|---|---|
| Component 1 (milling batch): | |
| Branched polyester with hydroxyl groups (OH content = approximately 8 percent by weight), 50 percent in dilution* | 400.0 gm |
| Titanium dioxide | 100.0 gm |
| Chrome ochre | 100.0 gm |
| | 600.0 gm |
| Lacquer solvent solution: | |
| Dilution* | 159.0 gm |
| Zinc octoate (8% Zn) | 1.0 gm |
| | 160.0 gm |

(The diultion* had the following relative composition: 30.0 gm of methylethyl ketone, 10.0 gm of butyl acetate, 30.0 gm of ethylene glycol monoethylether acetate, and 10.0 gm of toluene.)

Component 2:

240.0 gm of a polyfunctional, aliphatic isocyanate, 75% in ethylene glycol monoethylether acetate/xylene (1:1), (NCO-content 16.5%-wt.)

A polyacrylate/solvent mixture from Examples 1 to 8 or Comparison Runs a to c was added to the lacquer solution with the lacquer solvent solution, that is, the combination of Components 1 and 2 and the lacquer solvent solution. (The polyacrylate/solvent mixture could, however, be added instead of one of the individual components prior to admixture).

III. EXAMPLE 10

Testing of Lacquer Films

Films were prepared in which solvent-free epoxy resin lacquer A was applied to double-pickled, deep-drawing quality sheet steel (70×300×100 mm), as well as to glass plates of corresponding dimensions, with a 60-mm wide wiper, spaced 100μ apart. Films were prepared in similar manner from polyurethane lacquer B with the exception that the spacing was 200μ. After eight days of storing, under normal conditions, the following tests were performed:
1. Brightness (20° reflectometer value according to DIN 67530)
2. Pendulum hardness (DIN 53517)
3. Flow (visual evaluation)

Good flow was observed visually in all cases with the solvent-free epoxy resin A. The pendulum hardness was satisfactory and was between 183 and 186. The brightness was between 90 and 95.

Addition of 0.5 percent by weight of a solution polymerizate, based on the total weight of the mixture of epoxy resin lacquer A, was made for each polyacrylate/solvent mixture of Examples 1 to 8. The resulting films were evaluated, and pronounced orange-peel structure was observed. The brightness was only 69%. When films were prepared from epoxy resin lacquer compositions comprising 0.5 percent by weight of Comparison Run a or b, orange-peel structure was also observed. When 0.5 percent by weight of Comparison Run c was employed, the orange-peel structure was more moderate, but dinstinctly marked. The so-called "fish eyes" were observed in some of the films prepared from lacquer compositions containing Comparison Runs a, b, or c.

In further testing, addition of 0.2 percent by weight, based on the total weight of the mixture of polyurethane lacquer B, was made for each of the polyacrylate/solvent mixtures of Examples 1 to 8. After 8 days of storing, smooth flow was observed in each instance. A slight orange-peel structure could be seen in isolated spots. The pendulum hardness was between 200 and 225, and brightness was between 82 and 93%.

Films were prepared from polyurethane lacquer B, without any additives, and strong dimpling was observed. In three additional testings, 0.2 percent by weight of the polyacrylate/solvent mixtures of Comparison Runs a to c, respectively, were added to lacquer B. A distinct orange-peel effect was observed with respect to each of Comparison Runs a and b, and dimpling with fish eyes was found when the polyacrylate/solvent mixture of Comparison Run c was used.

The preceding specific embodiments are illustrative of the practice of the invention. It is it be understood, however, that other expedients known to those skilled in the art or disclosed herein, may be employed without departing from the spirit of the invention or the scope of the appended claims.

We claim:

1. A process for improving the flow properties of a lacquer selected from the group consisting of two-component polyurethane or epoxy lacquers, lacquers based upon alkyd resins, and lacquers based upon polyvinyl chloride which comprises adding to said lacquer a flow improving amount of a solution polymerizate prepared by polymerizing acrylate or methacrylate monomers in a batch comprising said monomers and a solvent comprising a high-boiling alcohol of from 8 to 40 carbon atoms and from 1 to 6 hydroxyl group, said batch containing from about 15 to 85 percent by weight of said monomers, based upon the weight of the total batch.

2. The process of claim 1 wherein from about 0.2 to 5 percent by weight of the solution polymerizate, based on the total weight of the lacquer, is added.

3. The process of claim 1 wherein the lacquer is selected from the group consisting of two-component polyurethane and epoxy lacquers.

4. The process of claim 1 wherein the lacquer is selected from the group consisting of lacquers based upon alkyd resins and lacquers based upon polyvinyl chloride.

5. The process of claim 1, wherein an alcohol having from 10 to 35 carbon atoms is used as the solvent.

6. The process of claim 1, wherein an alcohol having 1 to 4 hydroxyl groups is used as the solvent.

7. The process of claim 1, wherein the batch contains from about 30 to 75 percent by weight of said monomers.

8. The process of claim 1, wherein the polymerization is initiated by radical formers.

9. The process of claim 1, wherein the monomer components contain up to approximately 15 percent by weight of additional co-monomers.

10. The process of claim 1, wherein the alcohol component of the acrylate or methacrylate monomer contains an average of from 1 to 16 carbon atoms.

11. The process of claim 10, wherein the alcohol component of the acrylate or methacrylate monomers contain an average of from 2 to 10 carbon atoms.

12. The process of claim 1, wherein the alcohol component of the acrylate or methacrylate monomers is aliphatic or cycloaliphatic.

* * * * *